United States Patent [19]
Paparella

[11] Patent Number: 6,139,195
[45] Date of Patent: Oct. 31, 2000

[54] STRAIN RELIEF FOR A COATED OPTICAL FIBER IN A CONNECTOR

[75] Inventor: Joseph A. Paparella, Canyon Lake, Tex.

[73] Assignee: Minnesota Mining and Manufacturing Company, St. Paul, Minn.

[21] Appl. No.: 08/651,080

[22] Filed: May 22, 1996

[51] Int. Cl.[7] ................................................. G02B 6/36
[52] U.S. Cl. .................................................. 385/87; 385/86
[58] Field of Search .................................. 385/62, 66, 81, 385/84, 78, 86, 87

[56] References Cited

U.S. PATENT DOCUMENTS

| | | | |
|---|---|---|---|
| 4,133,601 | 1/1979 | Le Guen et al. | 385/81 |
| 4,148,557 | 4/1979 | Garvey | 385/87 |
| 4,447,121 | 5/1984 | Cooper et al. | 385/87 |
| 4,607,911 | 8/1986 | Rhodes | 385/86 |
| 4,668,045 | 5/1987 | Melman et al. | 385/82 |
| 4,679,895 | 7/1987 | Huber | 385/87 |
| 4,725,118 | 2/1988 | Serrander | 385/82 |
| 4,773,725 | 9/1988 | Ashman et al. | 385/87 |
| 4,779,949 | 10/1988 | Iri et al. | 385/86 |
| 4,838,641 | 6/1989 | Morimoto et al. | 385/87 |
| 4,961,624 | 10/1990 | Savitsky et al. | 385/84 |
| 4,964,685 | 10/1990 | Savitsky et al. | 385/58 |
| 4,968,109 | 11/1990 | Tanaka | 385/76 |
| 5,073,043 | 12/1991 | DiMarco et al. | 385/81 |
| 5,166,997 | 11/1992 | Norland et al. | 385/87 |
| 5,202,942 | 4/1993 | Collins et al. | 385/87 |
| 5,381,500 | 1/1995 | Edwards et al. | 385/78 |
| 5,418,874 | 5/1995 | Carlisle et al. | 385/76 |
| 5,425,119 | 6/1995 | Lee et al. | 385/86 |
| 5,425,120 | 6/1995 | Peterson et al. | 385/87 |
| 5,436,994 | 7/1995 | Ott et al. | 385/86 |
| 5,436,995 | 7/1995 | Yoshizawa et al. | 385/86 |

FOREIGN PATENT DOCUMENTS

405666 A2  2/1991  European Pat. Off. .

*Primary Examiner*—Rodney B. Bovernick
*Assistant Examiner*—Hemang Sanghavi
*Attorney, Agent, or Firm*—Gerald F. Chernivec; John C. McFarren

[57] ABSTRACT

An optical fiber connector having strain relief insert means to engage the buffered coating of the optical fiber cable upon the crimping of a crimp ring to cause the insert to flow in a direction toward the connector and the fiber to move toward the connector.

17 Claims, 2 Drawing Sheets

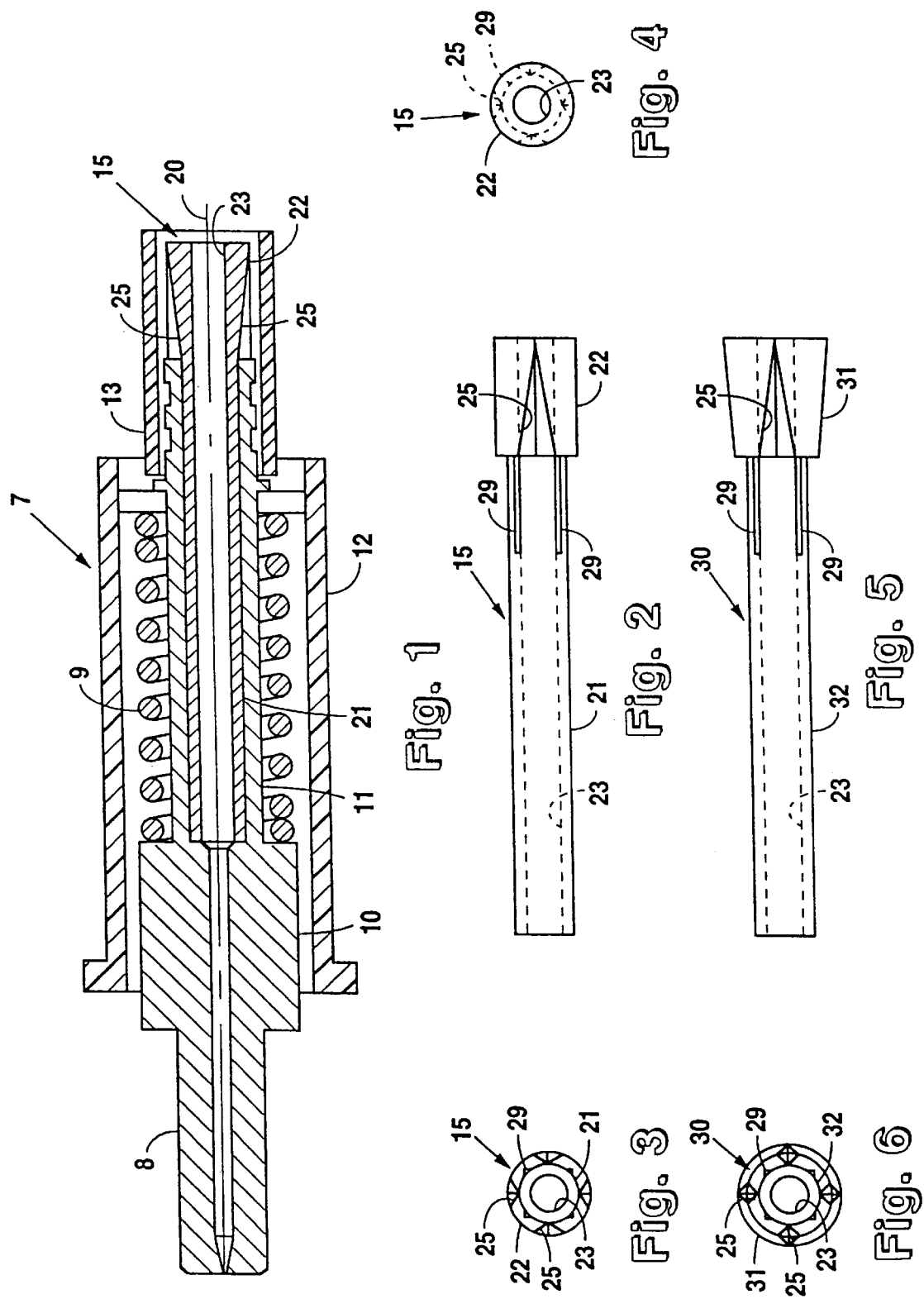

STRAIN RELIEF FOR A COATED OPTICAL FIBER IN A CONNECTOR

BACKGROUND OF THE INVENTION

1. Field of the Invention

This invention relates to an improvement in an optical fiber connector and in one aspect relates to an improved strain relief insert member for coated optical fiber cables for transferring stress on the fiber cable to movement of the fiber toward the connector.

2. Description of the Prior Art

The commercially available splice connectors use a formed end member on each fiber which typically includes a ferrule, a bayonet cover, which overlies a backbone or deformable strain relief member of the connector, and a collapsible strain relief member. The collapsible strain relief insert element is positioned partially within the backbone or strain relief member of the connector. The collapsible strain relief insert element is formed with slots in the terminal end which aid the element to collapse in an even manner. The collapsing terminal end of the strain relief element will grip the optical fiber cable when a crimp ring, placed over the deformable insert element and the strain relief member of the connector, is crimped. Such a structure is disclosed in U.S. Pat. No. 5,425,119 and available from the assignee of this patent (application). The insert element functions to deform around the buffer coating when the crimp ring of the connector is crimped over the insert. This serves to restrain the fiber cable from moving inside the fiber optic connector. Stress on the fiber is transferred to the insert. This area of support separates the stresses that are applied to the cable from being transmitted up the fiber into the connector. The stresses are instead transferred to the insert. Since the volume of the insert gets smaller when it is collapsed onto the fiber by the crimp ring, the material forming the insert tends to flow in the direction of least resistance. In this case the insert is against the connector backbone at one end and therefore its flow is determined by this boundary to be in the opposite direction away from the connector. Since the insert deforms around the fiber, the action of this material flow produces a secondary reaction causing movement of the fiber in the flow direction, away from the connector. The amount of movement depends upon the fiber coating diameter and the insert's outside and inside diameters. If the fiber is not allowed to move with the insert, that is by its being restrained inside of the connector by some means, adhesive, mechanical means, etc., the fiber is placed in a stressed state. This stressed state will cause the connector's performance to decline under outside stresses such as mechanical and environmental forces.

The present invention affords a structured insert which has means for controlling the flow of the insert material resulting in movement of the fiber towards the connector instead of away from the connector.

Improved strain relief resulting in restricted fiber movement and thus no stress onto the fiber through the action of crimping the crimp ring to the backbone, improves the connector performance. The present invention affords such improvements.

SUMMARY OF THE INVENTION

The present invention is directed to an optical fiber connector comprising a member forming a collar and backbone, about which a cover is placed, a collapsible crimp ring, and deformable strain relief insert element affording strain relief and restricted stress on the fiber. The insert is positioned partially within the backbone. The insert is deformable by a crimp ring positioned about the insert and a buffered optical fiber, upon deforming the crimp ring. The insert is structured with an elongate hollow tubular portion, having an end portion of greater outside diameter at one end, and grooves spaced about the outside periphery of the end portion. Each groove varies in depth and width from the terminal end toward the connector backbone. At the terminal end of the end portion, the depth and width of the grooves are generally zero. But, the grooves get wider and deeper as they approach the end of the tube portion that fits in the backbone. This structure allows control of the flow of the insert material as it is not blocked by the backbone and the secondary response is that the fiber will move, instead of away from the connector, towards the connector alleviating the tensile stresses on the fiber.

These and other novel features of the invention will be more fully described hereinbelow.

BRIEF DESCRIPTION OF THE DRAWINGS

The present invention will be described with reference to the accompanying Drawings wherein:

FIG. 1 is a schematic vertical sectional view of a fiber optic connector according to the invention:

FIG. 2 is an elevational view of the insert for the connector according to the present invention;

FIG. 3 is an end view of the left end of the insert illustrated in FIG. 2;

FIG. 4 is an end view of the insert showing the right end as seen in FIG. 2;

FIG. 5 is an elevational view of a further modification of the insert of the present invention;

FIG. 6 is an end view of the left end of the insert illustrated in FIG. 5;

DESCRIPTION OF THE PRESENTLY PREFERRED EMBODIMENTS

Figure 7:
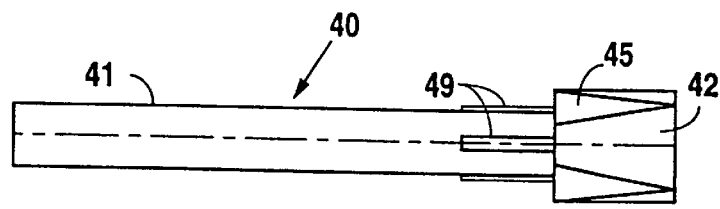
FIG. 7 is an elevational view similar to FIG. 2 showing the insert rotated on its longitudinal axis 45°.

The present invention provides an improved optical fiber connector 7 comprising a ferrule 8, backbone 11, about which a spring 9 is positioned to urge an integral collar 10 and the backbone 11 from a cover 12. The cover 12 is placed about the backbone 11, a collapsible crimp ring 13, and a deformable strain relief insert 15. The insert element 15 is positioned within the backbone and is deformable by the crimp ring 13 about a buffered optical fiber 20 when deforming the crimp ring 13. The insert 15 illustrated is adapted for use in the "ST" or similar connector and comprises a hollow tubular portion 21, which is preferably of generally cylindrical shape, having an end portion 22 at one end which has an outer diameter greater than the tubular portion, changing from, for example 0.067 inch (0.17 cm) to 0.130 inch (0.33 cm). The insert 15 has a center bore 23 with an inside diameter of generally 0.04 inch (0.10 cm) that receives the fiber cable. A guide member can be inserted in the distal end of the tubular portion and the end portion can have slots formed on the interior thereof communicating with the bore 23, these will be discussed later. V-grooves 25, four of them, are spaced about the outside diameter of the end portion 22. Each groove 25 varies in depth and width from the terminal end, where the depth and width is generally zero, toward the tube portion 21. The shoulder formed where the end portion 22 meets the tubular portion 21 will abut the end surface of the backbone 11 of the connector. The V-grooves 25 serve to force the insert 15 to deform incrementally towards the connector backbone 11. This is done by the grooves supplying the insert 15 with space for the material to flow into when it is being deformed. The deformation starts at the zero width and depth end of the grooves or at the terminal end of the end portion 22 and proceeds towards the other end adjacent the tubular portion and the backbone upon crimping the crimp ring 13, thus the flow of the insert material is controlled and is not blocked by the backbone. Therefore, the secondary response is that the fiber will move, instead of away from the connector, towards the connector alleviating the tensile stresses on the fiber.

Four friction members 29, in the form of ribs, also help in the flow of the insert 15. The friction members 29 are four ribs formed integral with the tubular portion about the periphery thereof and extending longitudinally along the tubular portion 21 from the end portion 22 toward the distal end of the tubular portion. The friction members 29 are encompassed normally inside a diameter of 0.073 inch (0.18 cm). When the tubular portion 21 is placed within the backbone, typically having an inside diameter for the bore of 0.070 inch (0.178 cm), this area is nearly completely circular, 360° of contact as opposed to the four distinct contact points. The action of crimping the crimp ring 13 to the grooved end of the backbone 11 will generally further deform the insert in this area due to the deformation of the backbone. This crimping action usually preceeds the crimping of the crimp ring onto the insert. This flow again is normally towards the rear of the connector due to the insert being constrained from flowing towards the ferrule due to the connector backbone stop. These four friction features 29 having only 4 distinct contact points, allow the insert 15 to deform inward, towards the center of the insert, but at a significantly less rate than if the insert was completely circular with 360 degrees of contact in the backbone prior to crimping. The four contact points or ribs 29 replace the primary deformation characteristics of deforming to fill the void between the four contact points. This restricts the fiber movement and thus induces no stress onto the fiber through the action of crimping the crimp ring 15 to the backbone 11.

Another feature that helps to develop the correct flow direction is illustrated in the embodiment of insert 30 illustrated in FIG. 5. In this embodiment, an end portion 31 tapers from an outside diameter of 0.130 inch (0.33 cm) at the terminal end down to a smaller outside diameter of 0.11 inch (0.28 cm) toward the tubular portion 32 which remains the same as tubular portion 21. This embodiment has an action similar to that of insert 15, such that after the fiber has been attached to the connector ferrule 8, either adhesively or mechanically, and the crimp ring 13 is crimped, the crimp ring will first deform the greater outside diameter and then incrementally deform the diameter in the direction of the smaller outside diameter toward the end of the backbone. This also effects the flow characteristics by forcing the flow in the preferred direction, toward the ferrule 8 of the connector. The inserts illustrated in FIGS. 2 and 5 serve to retain the fiber without inducing tensile stresses that might be deleterious to the performance of the connector.

Figure 8:
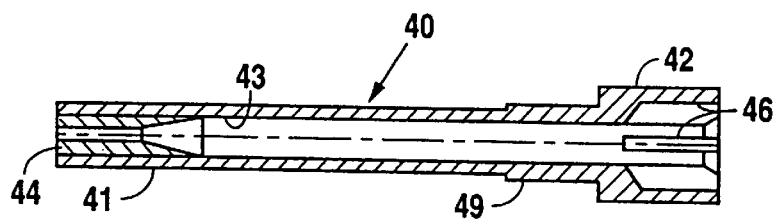
FIG. 8 is a vertical longitudinal sectional view of another insert according to the present invention.

FIGS. 7 and 8 illustrate another modification of the insert according to the present invention. In this insert, also adapted to the "ST" connector, the insert 40 comprises a hollow tubular portion 41, which is preferably of generally cylindrical shape, having an end portion 42 at one end which has generally an increased outer diameter corresponding to the insert 15. The insert 40 has a center bore 43 that receives the fiber cable. This insert 40 also has a guide 44, formed separately or integrally, in the bore 43 at the end opposite the end portion 42. The guide member 44 helps direct the optical fiber into the collar and the ferrule. Further, the end portion 42 has four radially directed slots 46 communicating with the central bore 43 to help the end portion 42 collapse in an even manner. The slots 46 extend from the terminal end toward the tubular portion. Grooves 45, four of them, are formed in spaced relationship about the outside diameter of the end portion 42. Each groove 45 varies in depth and width from the terminal end, where the depth and width is generally zero, toward the tube portion 41. Four friction members 49 are also formed on the tubular portion and serve the same function as on insert 15.

Figure 10:
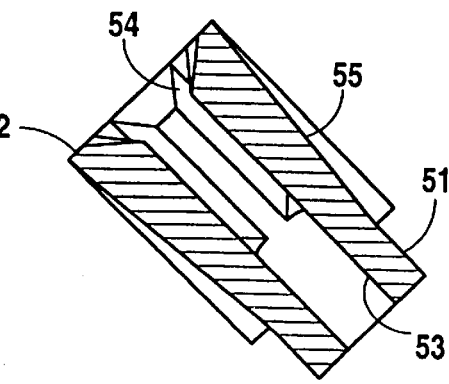
FIG. 10 is a longitudinal sectional view of the insert of FIG. 9 with the insert rotated endwise.
Figure 9:
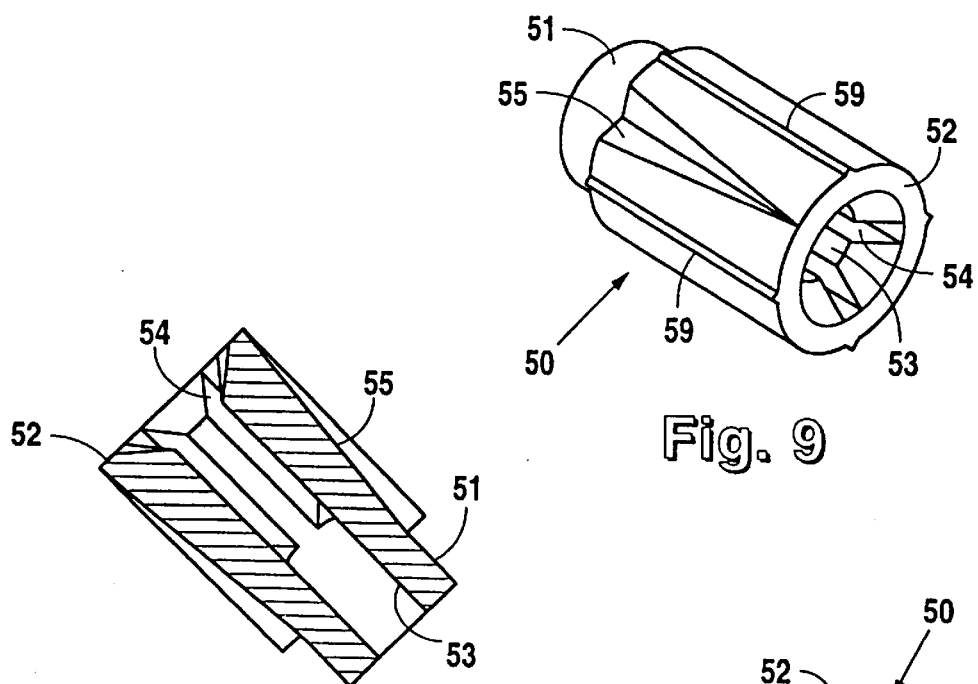
FIG. 9 is a perspective view of a further modification of an insert according to the present invention, which insert is usable with the "SC" connectors.
Figure 11:
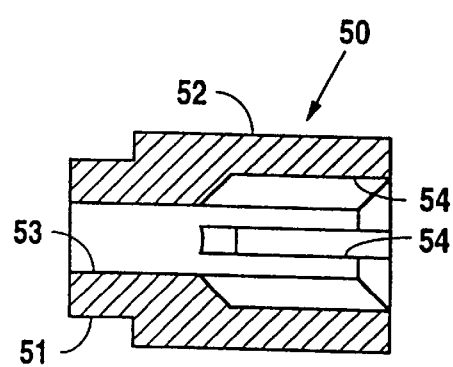
FIG. 11 is another longitudinal sectional view of the insert of FIG. 9 with the insert rotated slightly on its longitudinal axis.

FIGS. 9, 10 and 11 illustrate an insert 50 formed according to the present invention for use with the "SC" connector. This insert 50 has a tubular portion 51 of considerably reduced length, and an end portion 52 shaped to be received in the connector. The insert 50 has a central bore 53 formed with a plurality of slots 54 in the end portion, four of which are illustrated, radiating from the central bore 53 and extending from the terminal end of the end portion toward the tubular portion 52. The insert 50 also has grooves 55 formed in the end portion 52 which increase in width and depth from the terminal end of the end portion 52 toward the tubular portion 51. The grooves, V-shaped in design, are best seen in FIGS. 9 and 10. Slots 54 are best seen in FIGS. 9 and 11. Friction members 59 are illustrated in FIG. 9. On this insert 50 the friction members 59 extend axially and are positioned in spaced relationship about the outer diameter of the end portion 52 instead of the tubular portion 51. They serve to retain the insert 50 in the connector and to receive some of the flow of the insert material when the crimp ring is crimped onto the connector. The friction members 59 are spaced at 90° intervals about the periphery of the end portion 52. The slots and grooves are similarly spaced but the V-grooves 55 are offset 45° from the slots 54.

The inserts illustrated in FIGS. 7 and 9 serve to move the fiber toward the connector and to provide strain relief for the fiber. During the crimping onto the fiber, movement of the material of the insert is towards the connector, not away from it. The insert serves to retain the fiber, such that tensile stresses that might be deleterious to the performance of the connector, and placed upon the fiber, are restricted.

Having described the invention with reference to two illustrations of the improvement, it is contemplated that other changes in the connector can be made without departing from the spirit or scope of the invention as set forth in the appended claims.

I claim:

1. An optical fiber connector comprising
   a backbone having a bore extending from a first end toward a second end,
   a collapsible crimp ring placed about the first end of the backbone, and
   insert means having a tubular portion with an end portion on one end of said tubular portion, the end portion having a terminal end away from said tubular portion and having an increased outer diameter with grooves spaced about the outer diameter of said end portion and extending from the terminal end toward the tubular portion, said insert means affording strain relief when inserted within the bore from the first end of the backbone and deformed by said crimp ring about a buffered optical fiber inserted in the insert me, said insert means affording movement of said fiber therein toward the backbone upon crimping the crimp ring.

2. An optical fiber connector according to claim 1 wherein each groove varies in depth and width from the terminal end, where the depth and width is smaller, toward the tubular portion.

3. An optical fiber connector according to claim 2 wherein the end portion tapers toward the tubular portion from the terminal end.

4. An optical fiber connector according to claim 1 wherein the end portion tapers toward the tubular portion from the terminal end.

5. An optical fiber connector according to claim 1, wherein a plurality of friction members are formed integrally about the periphery of the insert means and extend longitudinally along the insert.

6. An optical fiber connector according to claim 5 wherein said friction members are in the form of ribs formed on the tubular portion and extend from the end portion toward the distal end.

7. An optical fiber connector according to claim 6 wherein said friction members are in the form of ribs formed on the end portion and extend along the end portion in spaced relationship to said grooves.

8. A deformable insert for an optical fiber connector comprising a tubular portion having a proximal end with an end portion connected thereto and a distal end, and having a bore extending through said tubular portion and said end portion for accepting a fiber cable, said end portion being of increased outer diameter from that of the tubular portion and having a terminal end away from said tubular portion with grooves spaced about the outer periphery, each groove varying in depth and width from said terminal end toward the tubular portion.

9. An insert according to claim 8 wherein the grooves are V-grooves having a depth and width of generally zero at the terminal end of the end portion.

10. An insert according to claim 8, wherein the outer diameter of the end portion gets increasingly smaller from the terminal end toward the tubular portion.

11. An insert according to claim 8 wherein said tubular portion has friction members spaced about the periphery and extending longitudinally from the proximal end toward the distal end.

12. An insert according to claim 8 wherein said end portion has friction members spaced about the periphery and extending from the terminal end toward the tubular portion.

13. An insert according to claim 8 wherein the tubular portion has a guide in the bore at the distal end, said guide having a smaller bore to accept an optical fiber.

14. An insert according to claim 13 wherein said end portion has slots communicating with said bore, which slots radiate from the bore in spaced relationship.

15. An insert according to claim 14 wherein the grooves are V-grooves having a depth and width of generally zero at the terminal end of the end portion, and said tubular portion has friction members spaced about the periphery and extending from the proximal end toward the distal end.

16. An insert according to claim 15 wherein said end portion tapers from said terminal end toward the tubular portion.

17. An optical fiber connector comprising a backbone having a bore extending from a first end toward a second end, a cover positioned over the backbone, a collapsible crimp ring placed about the first end of the backbone, and a deformable insert affording strain relief inserted within the bore from the first end of the backbone and formed to be incrementally deformed by said crimp ring about a buffered optical fiber inserted in the insert, said insert having a generally cylindrical tubular portion adapted to be received in said bore of said backbone, and said tubular portion having an end portion of a larger outside diameter on one end of said tubular portion which end portion abuts the first end of said backbone and is positioned within said crimp ring, said end portion having a terminal end away from said tubular portion and V-grooves spaced about the outer diameter of said end portion which grooves extend from said terminal end toward the tubular portion, with the grooves increasing in width and depth from said terminal end toward said tubular portion.

* * * * *